United States Patent
Reiff

[11] 3,821,313
[45] June 28, 1974

[54] 2-ALKYL-2-MERCAPTOMETHYL-1,3-PROPANE DIOLS

[75] Inventor: Helmut Reiff, Cologne-Flittard, Germany

[73] Assignee: Bayer Aktiengesellschaft, Leverkusen, Germany

[22] Filed: Dec. 18, 1972

[21] Appl. No.: 316,313

[30] Foreign Application Priority Data
Dec. 22, 1971  Germany............................ 2163677

[52] U.S. Cl............................................. 260/609 R
[51] Int. Cl............................................. C07c 149/18
[58] Field of Search ............................... 260/609 R

[56] References Cited
UNITED STATES PATENTS
3,609,189  9/1971  Bresson............................ 260/570.5
3,662,004  5/1972  Umbach et al................... 260/609 R FOREIGN PATENTS OR APPLICATIONS
988,135  4/1965  Great Britain ................. 260/609 R OTHER PUBLICATIONS
J.A.C.S–Oct. 1951, Searles 4,515–4,517.

Primary Examiner—Lewis Gotts
Assistant Examiner—D. R. Phillips
Attorney, Agent, or Firm—Burgess, Dinklage & Sprung

[57] ABSTRACT

2-alkyl-2-mercaptomethyl-1,3-propane diols having the formula

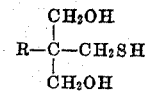

wherein R is an optionally substituted alkyl radical and are prepared by reacting 3-alkyl-3-hydroxymethyl oxetanes having the formula

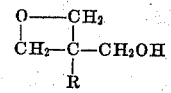

with hydrogen sulphide under elevated pressure at temperatures of up to 300°C.

3 Claims, No Drawings

2-ALKYL-2-MERCAPTOMETHYL-1,3-PROPANE DIOLS

BACKGROUND

This invention relates to certain 2-alkyl-2-mercaptomethyl-1,3-propane diols and to a process for their production.

It is known that 3-alkyl-3-hydroxymethyl oxetanes can be converted by the action of hydrohalic acid in aqueous solution under mild conditions into the corresponding 2-alkyl-2-halogen-methyl-1,3-propane diols. Under the same conditions, however, the oxetane ring is completely stable with respect to the extremely weak acid, hydrogen sulphide, and the corresponding reaction into 2-alkyl-2-mercaptomethyl-1,3-propane diols does not take place.

SUMMARY

It has now been found that novel 2-alkyl-2-mercaptomethyl-1,3-propane diols can be obtained by reacting 3-alkyl-3-hydroxymethyl oxetanes corresponding to the general formula (I):

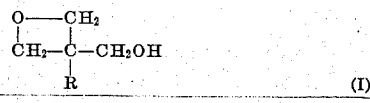

(I)

in which R represents an optionally substituted alkyl radical,
with hydrogen sulphide under elevated pressure at temperatures of up to 300°C.

DESCRIPTION

In general, the reaction is carried out at temperatures in the range of from about 130°C to about 300°C and preferably at temperatures of from about 150°C to about 220°C.

The reaction pressure is generally between about 10 atms. and about 200 atms. and preferably between about 30 and about 180 atms. However, where the process is not carried out continuously, it is also possible initially to introduce the corresponding quantity of hydrogen sulphide and to work at the pressure spontaneously prevailing at the temperature selected corresponding to the predetermined reaction parameters. It is also possible to work at the constant pressure selected by continuously replenishing the hydrogen sulphide consumed during the reaction.

Preferred optionally substituted alkyl radicals are those having from one to 18, most preferably having one to four, carbon atoms, and more particularly the methyl and ethyl radical.

The following are mentioned as examples of substituents of substituted alkyl radicals represented by R: halogen (fluorine, chlorine, bromine and iodine) preferably chlorine and bromine, and the hydroxy group, the hydrogen of which can also be substituted by lower aliphatic radicals having up to eight, preferably up to four, carbon atoms, or aromatic radicals having up to 14 carbon atoms, especially the phenyl radical, araliphatic radicals, having a total of up to 18 carbon atoms and having up to eight carbon atoms in the aliphatic portion, especially the benzyl radical, and by alkylcarbonyl-, aralkylcarbonyl- and arylcarbonyl groups, in which the alkyl-, aralkyl- and aryl radicals have the same meaning.

Preferred substituted radicals represented by R are the halogenmethyl- and hydroxymethyl radicals.

The 3-alkyl-3-hydroxymethyloxetanes used as starting materials for the process according to the invention can be obtained, for example, in accordance with the process described in U.S. Pat. No. 2,910,483.

The following oxetanes are preferably used for the process according to the invention: 3-methyl-3-hydroxymethyl oxetane, 3-ethyl-3-hydroxymethyl oxetane, 3-propyl-3-hydroxymethyl oxetane, 3-isopropyl-3-hydroxymethyl oxetane, 3-n-butyl-3-hydroxymethyl oxetane, 3-chloromethyl-3-hydroxymethyl oxetane, 3-bromomethyl-3-hydroxymethyl oxetane and 3,3-bis-hydroxymethyl oxetane. It is particularly preferred to use 3-methyl-3-hydroxymethyl oxetane and 3-ethyl-3-hydroxymethyl oxetane.

In general, the oxetanes used as starting material can be used in the form of crude products containing small quantities of impurities, for example alcohols and/or dialkyl carbonates, without any adverse effect upon the reaction. The aforementioned impurities can be present, for example, in crude oxetanes of the kind obtained by reacting 1,1,1-trishydroxymethylalkanes with dialkylcarbonates, followed by thermolysis.

The purity of the hydrogen sulphide is also not critical and it is quite possible to use commercial grades. The hydrogen sulphide can also be diluted with an inert gas (for example carbon dioxide or nitrogen).

The hydrogen sulphide must be used in at least the stoichiometric ratio, although it is preferably used in a ratio of about 1 : 1 mols to about 6 mols per mol of oxetane. Although the use of a larger excess of hydrogen sulphide is harmless, it is unnecessary.

The reaction can also optionally be carried out in a polar organic solvent, although it is preferably carried out in the absence of a solvent. The following are mentioned as examples of polar organic solvents: alcohols (for example methanol, ethanol, isopropanol and butanol), ketones (for example acetone and methylethyl ketone), ethers (for example tetrahydrofuran and dioxan), also for example dimethyl formamide, dimethyl sulphoxide, dimethyl acetamide and, optionally, substituted phenols as well.

However, it is preferred to use water as the solvent. Accordingly, the oxetanes used as starting material can also contain water up to saturation level or can be in the form of aqueous emulsions.

In general, the process according to the invention is carried out in batches in an autoclave by introducing the 3-alkyl-3-hydroxymethyl oxetane into an autoclave rinsed with nitrogen, closing the autoclave, introducing hydrogen sulphide under pressure, and subsequently heating, for example for about 12 hours to a temperature of around 190°C. After the pressure and/or excess hydrogen sulphide has been let off, the corresponding 2-alkyl-2-mercaptomethyl-1,3-propane diol is generally obtained in an excellent yield in the form of a highly pure, crystalline product. The reaction product may optionally be obtained in particularly high purity by degassing it and/or by known processes (for example distillation and/or crystallisation).

However, the process according to the invention can also be carried out continuously in a reactor, for example in a tubular reactor or in a pressure coil. The type and size of the reactor used should be so selected that the necessary reaction or residence time is obtained. Similarly, the reaction and reactor temperature selected will be above the melting point of the corresponding reaction product in order to prevent it from crystallising out in the reactor.

Conventional materials, for example refined steels, nickel, platinum and tantalum, will generally be used for the apparatus in which the process according to the invention is carried out, for example autoclaves and reactors. The pressure-tight apparatus may optionally also be lined with a non-pressure-tight internal layer, for example of enamel, plastics, rubber or a metal (plating). Alternatively, a non-pressure-tight inner vessel, for example of glass, can be used. The process according to the invention is illustrated by the following formula scheme with reference to the particular example of 3-methyl-3-hydroxymethyl oxetane:

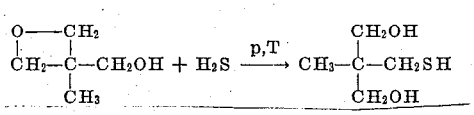

The 2-alkyl-2-mercaptomethyl-1,3-propane diols which are obtained by the process according to the invention correspond to the general formula

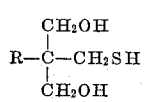

in which R is as defined above.

The novel 2-alkyl-2-mercaptomethyl-1,3-propane diols are valuable organic intermediate products which can be converted, for example by known methods, into disulphides, disulphones, dihydroxysulphonic acids and hydroxymethyl sultones.

They can also be used for the production of mercapto-group-containing polyurethanes and polyurethane prepolymers.

The products obtained by the process according to the invention can also be reacted with unsaturated polyesters containing carboxyl or carboxylate groups, to produce crosslinkable lacquers.

For example, 8 g of N-dimethylaminoethanol were added with a stirring at a temperature of 80°C to 50 g of a diethylene glycol-maleic acid polyester of molecular weight 2,100 (acid number 91), followed after a few minutes by the addition of 37 g of 2-ethylmercaptomethyl-1,3-propane diol under the same conditions. After an exothermic reaction and stirring for 20 minutes at 75°C, 96 g of water were added. 12 g of a 65 percent aqueous solution of melamine pentamethylolether were then added to the resulting clear solution.

150 parts of the lacquer solution were homogenised in a ball mill with 38 g of titanium dioxide paste. The white-pigmented lacquer thus obtained with a solids content of 51 percent was coated on to glass or steel plate and stoved for 40 minutes at 160°C. An elastic lacquer finish of high surface gloss was obtained.

EXAMPLE 1

136 g (4 mols) of hydrogen sulphide were added to 116 g (1 mol) of 3-ethyl-3-hydroxymethyl oxetane in an enamel autoclave flushed with nitrogen and the contents of the autoclave were maintained at 190°C for 20 hours. 2-Ethyl-2-mercaptomethyl-1,3-propane diol was obtained in a yield of 146 g of crude product. It was purified by distillation (boiling point $_{0.1\ Torr}$ = 111°–113°C) or by recrystallisation from non-polar solvents (m.p. 68°–70°C).

Elemental analysis: $C_6H_{14}O_2S$ (MW = 150)

| Calculated | C 48.0% | H 9.4% | O 21.3% | S 21.3% |
|---|---|---|---|---|
| Found: | C 48.1% | H 9.4% | O 21.4% | S 21.1% |

EXAMPLE 2

As in Example 1, 204 g (2 mols) of 3-methyl-3-hydroxy-methyl oxetane were reacted for 20 hours at 180°C with 170 g (5 mols) of hydrogen sulphide. Crude 2-methyl-2-mercapto-methyl-1,3-propane diol was obtained in a yield of 264 g, b.p.$_{0.1\ Torr}$ = 107°–108°C, m.p. 47°–49°C.

Elemental analysis: $C_5H_{12}O_2S$ (MW = 136)

| Calculated | C 44.1% | H 8.9% | O 23.5% | S 23.5% |
|---|---|---|---|---|
| Found: | C 44.2% | H 8.9% | O 23.3% | S 23.4% |

EXAMPLE 3

As in Example 1, 165 g (86 percent of the theoretical) of 2-n-amyl-2-mercaptomethyl-1,3-propane diol of b.p.$_{0.4\ Torr}$ = 173°–176°C were obtained in 20 hours at 190°C from 158 g (1 mol) of 3-n-amyl-hydroxymethyloxetane and 51 g (1.5 mols) of hydrogen sulphide.

Elemental analysis: $C_9H_{20}O_2S$ (MW = 192)

| Calculated | C 56.2% | H 10.5% | S 16.7% | O 16.6% |
|---|---|---|---|---|
| Found: | C 56.2% | H 10.6% | S 16.7% | O 16.5% |

The 3-n-amyl-3-hydroxymethyl oxetane used as starting material was obtained in an 84 percent yield by reacting 1,1,1-trishydroxymethyl hexane with diethyl carbonate in a molar ratio of 1:1, followed by thermal decarboxylation of the cyclic carbonate in the presence of traces of potassium carbonate; boiling point $_{17\ Torr}$: 148°–149°C, $n_D^{20}$ = 1.4555.

EXAMPLES 4–7

In these Examples, the quantity specified in the following Table of solvent and 41 g (1.2 mols) of hydrogen sulphide were added to separate batches of 102 g (1 mol) of 3-methyl-3-hydroxymethyl oxetane in an enamel autoclave flushed with nitrogen, and maintained for 10 hours at a temperature of about 190°C. The 2-methyl-2-mercaptomethyl-1,3-propane diol was obtained in the yields shown in the following Table in addition to unreacted starting material (if any).

| EXAMPLE No. | g of SOLVENT | YIELD OF 2-METHYL-2-MERCAPTO METHYL-1,3-PROPANE DIOL in % OF THEORETICAL | % of UN-REACTED STARTING MATERIAL |
|---|---|---|---|
| 4 | 60 g of phenol | 87.7 | 12.3 |
| 5 | 60 g of water | 94.1 | 5.9 |
| 6 | 60 g of methanol | 100 | — |
| 7 | 60 g of water + 6 g of carbon dioxide | 100 | — |

What is claimed is:

1. 2-alkyl-2-mercaptomethyl-1,3-propane diols having the formula

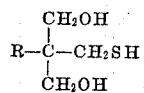

wherein R is an alkyl radical with up to 18 carbon atoms unsubstituted or substituted by a halogen or hydroxy group.

2. Diols of claim 1 from the group of 2-ethyl-2-mercaptomethyl-1,3-propane diol, 2-methyl-2-mercaptomethyl-1,3-propane diol and 2-n-amyl-2-mercaptomethyl-1,3-propane diol.

3. Diols of claim 1 wherein R is an alkyl radical with up to four carbon atoms unsubstituted or substituted by chlorine, bromine or the hydroxy group.

* * * * *